US007299616B2

(12) United States Patent
Filippone (10) Patent No.: US 7,299,616 B2
(45) Date of Patent: Nov. 27, 2007

(54) SMALL SCALE HYBRID ENGINE (76) Inventor: Claudio Filippone, 8708 48th Pl., College Park, MD (US) 20740

( * ) Notice: Subject to any disclaimer, the term of this patent is extended or adjusted under 35 U.S.C. 154(b) by 0 days.

(21) Appl. No.: 11/319,079

(22) Filed: Dec. 28, 2005

(65) Prior Publication Data
US 2006/0107663 A1 May 25, 2006

Related U.S. Application Data (63) Continuation of application No. 10/261,685, filed on Oct. 2, 2002, now Pat. No. 7,047,722.

(51) Int. Cl.
F02C 6/00 (2006.01)
F02G 1/00 (2006.01)
F02G 3/00 (2006.01)
(52) U.S. Cl. ..................... 60/39.182; 60/39.5
(58) Field of Classification Search ............. 60/39.181, 60/39.182, 39.183, 39.511, 39.5
See application file for complete search history.

(56) References Cited

U.S. PATENT DOCUMENTS

| 3,705,492 | A | 12/1972 | Vickers |
| 4,297,842 | A | 11/1981 | Gerhold et al. |
| 4,474,014 | A | 10/1984 | Markowski |
| 4,571,935 | A | 2/1986 | Rice |
| 4,628,687 | A | 12/1986 | Strom |
| 4,687,946 | A | 8/1987 | Jones |
| 4,928,481 | A | 5/1990 | Joshi et al. |
| 5,013,236 | A | 5/1991 | Khinkis |
| 5,679,931 | A | 10/1997 | Furse et al. |
| 5,735,126 | A | 4/1998 | Schulte-Werning |
| 5,778,657 | A | 7/1998 | Ohtomo et al. |
| 5,802,841 | A | 9/1998 | Maeda |
| 5,839,270 | A | 11/1998 | Jirnov et al. |
| 5,855,112 | A * | 1/1999 | Bannai et al. ........... 60/39.511 |
| 5,896,740 | A | 4/1999 | Shouman |
| 5,906,095 | A | 5/1999 | Frutschi et al. |
| 6,018,941 | A | 2/2000 | Massey |
| 6,098,398 | A | 8/2000 | Uematsu et al. |
| 6,105,362 | A * | 8/2000 | Ohtomo et al. ........... 60/39.182 |
| 6,109,019 | A | 8/2000 | Sugishita |
| 6,220,013 | B1 * | 4/2001 | Smith ......................... 60/783 |
| 6,263,661 | B1 * | 7/2001 | van der Burgt et al. ... 60/39.17 |
| 6,370,862 | B1 | 4/2002 | Cheng |
| 6,438,962 | B1 | 8/2002 | Blain et al. |
| 6,474,069 | B1 * | 11/2002 | Smith ......................... 60/727 |
| 6,477,842 | B1 * | 11/2002 | Nagata et al. .............. 60/772 |
| 6,529,849 | B2 * | 3/2003 | Umezawa et al. .......... 702/136 |
| 6,543,214 | B2 * | 4/2003 | Sasaki et al. .............. 60/39.5 |
| 6,672,070 | B2 | 1/2004 | Bland et al. |
| 6,711,889 | B2 * | 3/2004 | Kuo et al. ............... 60/39.511 |

(Continued)

Primary Examiner—William H. Rodriguez (57) ABSTRACT

This invention describes a miniaturized hybrid diesel-electric engine formed by a closed-loop system powered by plasma-aided combustion of JP-8 fuel (or other hydrocarbon fuels) working in tandem with a vapor cycle utilizing miniaturized expanders and condensers. The output of this engine is electric power and mechanical work. Water, or organic fluids, heated by the combustion product developed inside a special burner, undergoes an explosive, quasi-supersonic conversion to steam. This steam drives a high-speed turbine connected together with a gas turbine outputting shaft work. This work output is utilized to power internal subsystems, cool down the miniaturized condensers, and to produce torque and electric power. The dimensions of this miniaturized hybrid-engine are so compact that it can fit inside the battery compartment of most applications requiring high-density miniaturized power sources.

20 Claims, 7 Drawing Sheets

U.S. PATENT DOCUMENTS

| | | |
|---|---|---|
| 6,735,950 B1 | 5/2004 | Howell et al. |
| 6,748,735 B2 | 6/2004 | Schmotolocha et al. |
| 6,826,913 B2 | 12/2004 | Wright |
| 6,851,266 B2 * | 2/2005 | Liebig .................. 60/772 |
| 2002/0002820 A1 * | 1/2002 | Takehara .................. 60/39.511 |
| 2002/0023423 A1 * | 2/2002 | Viteri et al. ................ 60/39.02 |
| 2003/0066291 A1 | 4/2003 | Flippone |
| 2003/0179844 A1 | 9/2003 | Flippone |

* cited by examiner

SMALL SCALE HYBRID ENGINE

This is a continuation of application Ser. No. 10/261,685, filed Oct. 2, 2002, now U.S. Pat. No. 7,047,722, which is incorporated herein by reference.

BACKGROUND OF THE INVENTION

The conversion of compact gasoline spark ignition engines to diesel or heavy-fuels operated engines for various applications requiring miniaturized power sources, including robotics and exoskeleton, and small scale propulsion system, forces a series of adaptation of the current off-the-shelf engines. These adaptations allow a conventional miniaturized gasoline engine to be fueled by heavy-fuels at the expense of significant inefficiencies. Most of these diesel operated gasoline engines have serious ignition difficulties, especially at sub-zero temperatures, and generally show poor performance with respect to the actual power available for energy extraction from the fuel. Furthermore, increased fuel consumption with production of heavy smoke and pollutant emissions, and several other negative factors, severely penalizes the adoption of these modified engines. The need for air-breathing small-scale propulsion systems, with high power densities for civilian and military applications is ever increasing. The objective of the present invention is to provide a small-scale hybrid-engine (SSHE) formed by the integration of several technologies allowing its miniaturization without impairing the overall engine efficiency.

A secondary objective of the proposed invention is that of providing a wearable power source equipped with its own fuel tank, pumps, starter mechanisms, mufflers, injectors, etc. This wearable, or mobile, SSHE system can deliver a minimum of 20 W average for prolonged amounts of time with minimum fuel consumption, and load following characteristics. SSHE can also produce a scalable power output able to achieve and exceed this minimum power requirement so that it can serve multiple applications. Such applications may require a power source for power hungry systems such as microclimate cooling with power requirements in excess of 1200 W-hr, or able to provide shaft power for actuators used for robotic applications, or as a propulsion system for remotely controlled vehicles. Load following characteristics imply a rigorous control of the various combustion parameters forcing a fast response on the rotating components of the burner. All components are designed for minimum weight and bulk. Components like miniaturized compressor and exhaust gases wheels impose high degrees of manufactory accuracy and complexity. All of the components of this invention can function in a wide range of temperatures and environments, including submerged in water, while resisting to shocks derived from mechanical impacts or explosions. The complete system is reliable and damage-tolerant, posing no hazards to the operator.

To meet these requirements, technology has been pushed beyond its current limits and the integration of several innovative concepts produced the SSHE. Every ounce of mass of the SSHE system contributes to performance, and every watt generated, thermal, electrical, or mechanical is applied with the highest conversion efficiency. These are the main objectives of the SSHE proposed as a miniaturized power source utilizing fossil fuels.

SUMMARY OF THE INVENTION

The heart of the Small Scale Hybrid Engine (SSHE) is a special fluid-expanding cavity thermally coupled with a plasma-aided hydrocarbon burner equipped with a U-turn combustion gases circuit. The combustion cycle executed by the burner works in tandem with a Rankine-like vapor cycle operating between a hot source formed by the combustion products and a cold source formed by a heat transfer mechanism between the burner intake air and special condensation cavities. The cold source is a highly conductive-to-convective heat transfer surface in thermal contact on one side with the large mass flow rate of intake air. This condensing cavity discharges the excess heat from the working fluid in a closed loop to the environment while providing the muffler structure of the burner capsule for sound abatement. Efficiency of the vapor-combustion cycle is estimated at approximately 54% for a JP-8 fueled SSHE. Combustion energy is also stored in the mass of the thermal reservoir structure forming a thermal flywheel, and can rapidly be converted into pressure, and mechanical work, using the fluid expanding cavity which achieves extremely high heat transfer rates from the thermal reservoir to said working fluid. The heat energy thus transferred to said working fluid is applied to an electronically controlled alternator/starter whose rotor is embedded in the vapor turbine or in a separate disk for electric production. Said vapor turbine is also mechanically linked to an exhaust gas turbine driven by the expansion of combustion gases inside the core of the burner structure. Said turbines produce torque for electric production as well as shaft power mechanically transferred via geared coupling for different rpm between the turbines themselves while providing a mechanical coupling for a torque output of the SSHE.

DESCRIPTION OF THE PREFERRED EMBODIMENTS

The working principles of the SSHE system are now described by utilizing the schematics and representations shown in FIGS. 1-7.

Figure 1:
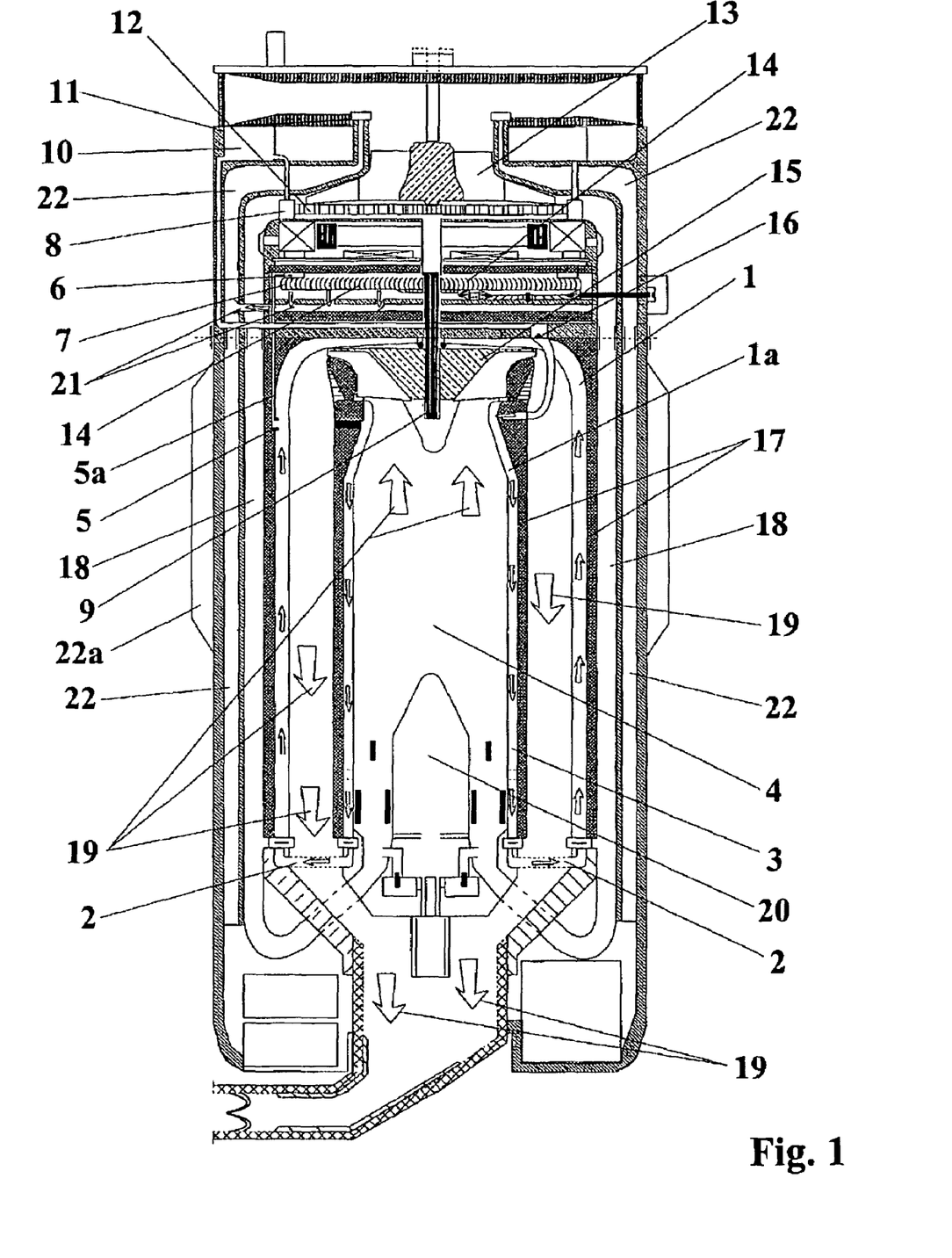
FIG. 1; Is a schematic representation of the SSHE internal structures with flow lines indicating the combustion gases circuit and the vapor-cycle formed by a closed loop integrating the working fluid tank, sealed hydraulic connections, pump(s), double counter flow fluid expanding heat transfer system, and the condensing cavities.

In FIG. 1, two cylindrical fluid expanding cavities 1, and 1a, here shown in cross-section view, are assembled around the basic structure of the SSHE combustion chamber 4. The body of the fluid-expanding cavity 1a is formed by concentric and sealed cylinders-like structures separated by a gap within which the working fluid 10 contained inside a toroidal storage tank 11 expands. Tank 11 shown in FIG. 1 is not to scale. Similarly, the body of fluid-expanding cavity 1 is formed by concentric sealed cylinders internally separated by a gap within which the working fluid 10 expands. Said working fluid 10 is pumped at relatively high-pressure inside the fluid expanding cavity 1a through one or more high-pressure miniaturized pump(s) 8 geared through a gear assembly 12 to a set of turbines 13, 14, and 15 linked to the same shaft 9. The high-pressure pump 8 is a piston driven positive displacement pump. Each stroke of pump 8 delivers an amount of working fluid 10 proportional to the rotating speed of shaft 9. Pump 8 is hydraulically connected to a high-pressure fluid injector 16 acting as a check valve. When pump 8 is set in motion by the alternator/starter system 23 (shown in FIG. 3), high pressure working fluid 10 is throttled inside the fluid-expanding cavity 1a through check valve 16. Sub-cooled liquid working fluid 10 is now exposed to a heat transfer thermodynamic process since the inner surfaces of said fluid-expanding cavity 1a are in thermal contact with the combustion gases 19 produced inside combustion chamber 4. The outer surfaces of fluid-expanding cavity 1a are kept at almost adiabatic conditions by means of thermally insulating materials 17 surrounding fluid-expanding cavity 1a and 1. The working fluid 10 exits fluid injector 16 and expands in a counter-flow fashion with respect to the direction of the hot combustion gases 19. It reaches the bottom of the burner structure 20 and enters hydraulic connections 2 disposed radially and exposed to the high temperatures of the combustion gases 19, without mixing with said gases. These hydraulic connections 2 allow the expanding fluid 10 from cavity 1a to enter fluid-expanding cavity 1 and undergo an additional heat transfer and thermodynamic process to increase its energy content. While transiting inside fluid-expanding cavity 1 in a counter-flow fashion with respect to the direction of the combustion gases 19, heat transfer occurs through the inner walls and surfaces of fluid-expanding cavity 1 so that at its outlet 5 the working fluid 10 is at high pressures and temperatures, in a superheated state. Fluid expanding cavity 1 is thermally insulated from the air intake manifold cavity 18 surrounding the structure of said fluid expanding cavity 1. Through hydraulic and sealed connection between 5 and 5a (see also FIG. 3), said superheated working fluid is allowed to expand through one or more nozzles 6 into a set of high-pressure vapor-turbine(s) 14 co-axially and mechanically linked with shaft 9. The mechanical connection of said vapor turbine 14 can be directly coupled to shaft 9, or indirectly coupled to shaft 9 by means of gear changing the speed ratio. At the outlet of blades 7 of turbine(s) 14 the expanded working fluid 10 flows through hydraulic vapor venting connections 21 inside a condensing cavity 22 surrounding all other cavity structures. The condensing cavity 22 is formed by concentric cylinders-like sealed and positioned so as to form a gap in between the outer surface of the inner cylinder and the inner surface of the outer cylinder. Inside this gap the expanded working fluid 10 releases heat to the intake air manifold via the inner walls of said condensing cavity 22 without mixing with said intake air. The expanded working fluid 10 also releases heat to the outer wall of said condensing cavity 22 via natural or forced convection with the environment surrounding said condensing cavity 22 through fins 22a positioned radially along the SSHE body. The expanded fluid 10 releases heat along the whole length and surfaces of the condensing cavity 22 such that the induced temperature drop causes the expanded working fluid 10 to return to a sub-cooled liquid state. The suction of pump 8 can be positioned anywhere along the working fluid collective tank formed by tank 11, surrounding the top structure of the SSHE, the hydraulic connections to the condensing cavity 22, and inside the gap itself of condensing cavity 22. Shaft 9 is also geared to a set of speed reducing/increasing gears 45 (more in detail in FIG. 3), which provide speed adjustment for the different turbines 13, 14, and 15 and a mechanical outlet equipped with a coupler 44 so as to provide external shaft power to the user at the desired torque and rpm. This concludes the closed loop SSHE vapor cycle of working fluid 10 described in FIG. 1 and FIG. 3.

Figure 2:
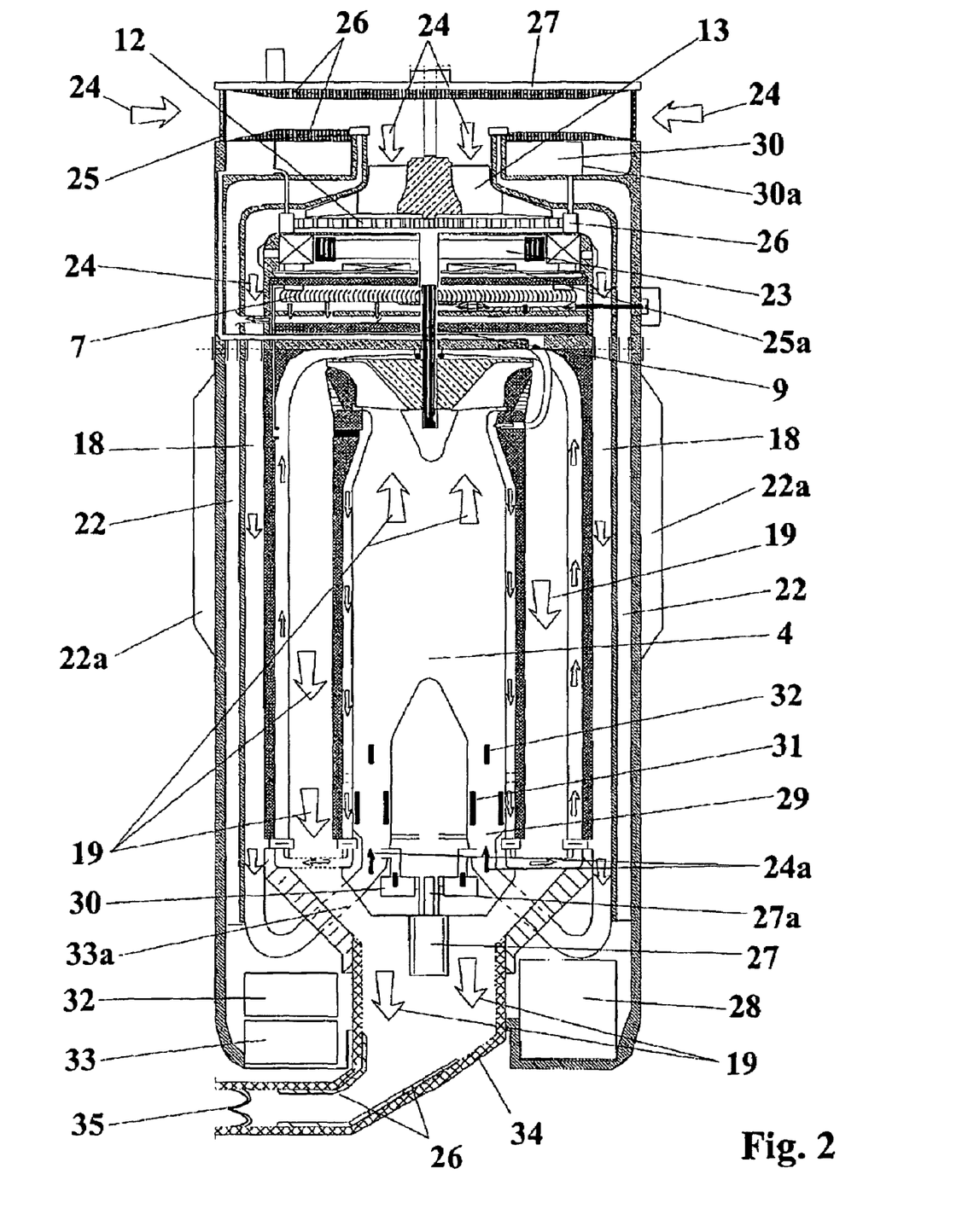
FIG. 2; Is a schematic representation of the SSHE internal structures with flow lines indicating mainly the fossil fuel burning cycle formed by special fuel expanding injection, ionization, and ignition systems, a U-turn exhaust gas circuit coupled with high heat transfer rate working fluid expanding systems. Said fossil fuel burning cycle including fuel tank, pump, starter all self contained inside the SSHE structure.

The burner side of the SSHE system is best described in FIG. 2. At the top of FIG. 2, the electric alternator/starter formed by a rotating disk 23 receives shaft power from shaft 9 whose torque magnitude is the result of the expansion of combustion gases 19, produced in the combustion chamber 4, and the expansion of working fluid 10 through the high-pressure vapor turbine(s) 14. Air 24 enters the SSHE from an air filter 25 positioned above the intake of compressor turbine 13. To reduce acoustic signature caused by the inlet air-flow, and especially by the high speed (10,000 rpm range) of the compressor turbine 13, the inner walls of the intake manifold are lined with sound absorbing materials 26, thereby forming the intake muffler 27. For a 20 W-electric power output the overall weight of the SSHE rotating parts is low enough to make gyroscopic effects negligible. The air filter 25 can be positioned on the circumference of the SSHE or anywhere along the intake air path. In both cases the SSHE inlets can be made water sealed by turning said air filter casing 27 or by pressing it against the compressor wheel 13 inlet. When this operation is executed, an air-flow sensor embedded anywhere in the air intake path utilized by the SSHE computer controller 25a for fuel metering purposes detects the rapid change in inlet pressure, and the SSHE fuel control system immediately deactivates the fuel pump 26 or the fuel vaporizing and injecting system 27 to shut down the burner. This feature allows the submersion of the SSHE, while electric power is still provided thanks to start-up and back-up batteries 28. The capacity of these batteries determines the time the SSHE can be submerged and still provide full power to the user. For a 20-Watt average power demand a relatively small ion-lithium battery 28 used to start the SSHE can maintain the required power output for several hours with the SSHE burner in shut-down mode. The bearings (not shown in FIG. 2) for the compressor turbine 13 and the alternator/starter shaft (coupled directly or indirectly with drive shaft 9), can be made of self-lubricating materials, or lubricated by a closed loop oil circulation system geared with the drive shaft 9.

When air 24 enters the suction side of the compressor turbine 13, it undergoes a compression process while channeled into the jacket-like hydraulic structure 18 surrounding the burner. Structure 18 forms a cavity in thermal contact with the condensing cavity 22 but thermally insulated from combustion gases 19. In this manner, a relatively large mass flow of cold air is forced into contact with the surfaces of the condensing cavity 22 which, in this configuration, is also utilized as a device to cool down the exhaust gases to reduce thermal signature by bleeding cold air through calibrated orifices 33a. Through the compressor turbine 13, compressed air 24 is available at the inlet 29 of the burner 4 where mixing with a superheated JP-8 vapor jet occurs. This jet of fuel vapors is produced by a miniaturized heat expanding fuel injection system 27 which converts liquid fuel into superheated fuel vapor instantaneously. Fuel 30 is stored in a semi-toroidal tank 30a (not to scale), positioned above and surrounding the structure of compressor turbine 13, and pumped into heat expanding fuel system 27 through fuel pump 26. At start-up the heat expanding fuel injection system 27 is electrically heated through a heater 27a powered via electronic control from CPU circuit 25a by the start-up battery 28. Soon after ignition of the burner the temperature of this heat expanding fuel injection system 27 is kept at the proper level through heat transferring from the exhausting combustion gases 19. At the burner inlet 29, JP-8 vapors and air undergo a violent ionization shower through symmetrical electrodes 31 powered by a controlled cold plasma generator 32. Ionized species formed via cold corona discharge increase mixing favoring combustion while containing the air fuel mixture away from the metal walls of the surrounding structure to minimize fuel condensation. An instantaneous wall of approximately 5,000° C. plasma-flame is then formed in front of the ionized mixture through hot plasma electrodes 32 controlled by a hot plasma generator and controller 33. The ionized air fuel mixtures ignites and expands in the combustion chamber 4. Virtually any fuel available will ignite under these conditions, thereby SSHE can operate with several types of liquid or gaseous fuels. While expanding, the high-pressure, high-temperature exhaust combustion gases 19 enter the exhaust gas turbine 15 powering the alternator/starter system 23 and the compressor wheel 13 in tandem with the torque generated by the vapor cycle through high-pressure turbine(s) 14. The shaft work generated by the combustion process also provides power to the fuel-pump 26 geared with the exhaust gas turbine 15 via drive shaft 9. Exhaust combustion gases 19 circulate inside the body of the SSHE and transfer heat to the surfaces of the condensing cavity 1a and 1. To decrease thermal signature due to the high temperature of the exhaust gases 19 these gases can be mixed with cold air 24 bled from the compressed air burner intake manifold 33a. This process is inefficient, but provides significant cooling to the exhaust gases 19 before they enter the muffler 34. Said muffler 34 is lined with sound absorbing materials 26, thereby reducing thermal and acoustic signature. Therefore, exhaust combustion gases 19 will exit the SSHE unit with reduced temperature and noise since the outlet muffler 34 is lined with sound absorbing materials 26 shaped to reduce the sound produced by the combustion processes and the turbines operation. A flexible membrane 35 is positioned at the outlet of the muffler 34 forming a check valve automatically sealing the SSHE when submerged. Overall, the SSHE is designed with multiple barriers to heat and sound. The fluid expanding cavities 1a, and 1, and the condensing cavity 22 by being formed by series of concentric cylinders become a heat and sound shield while making the SSHE structure extremely compact and damage tolerant.

Figure 3:
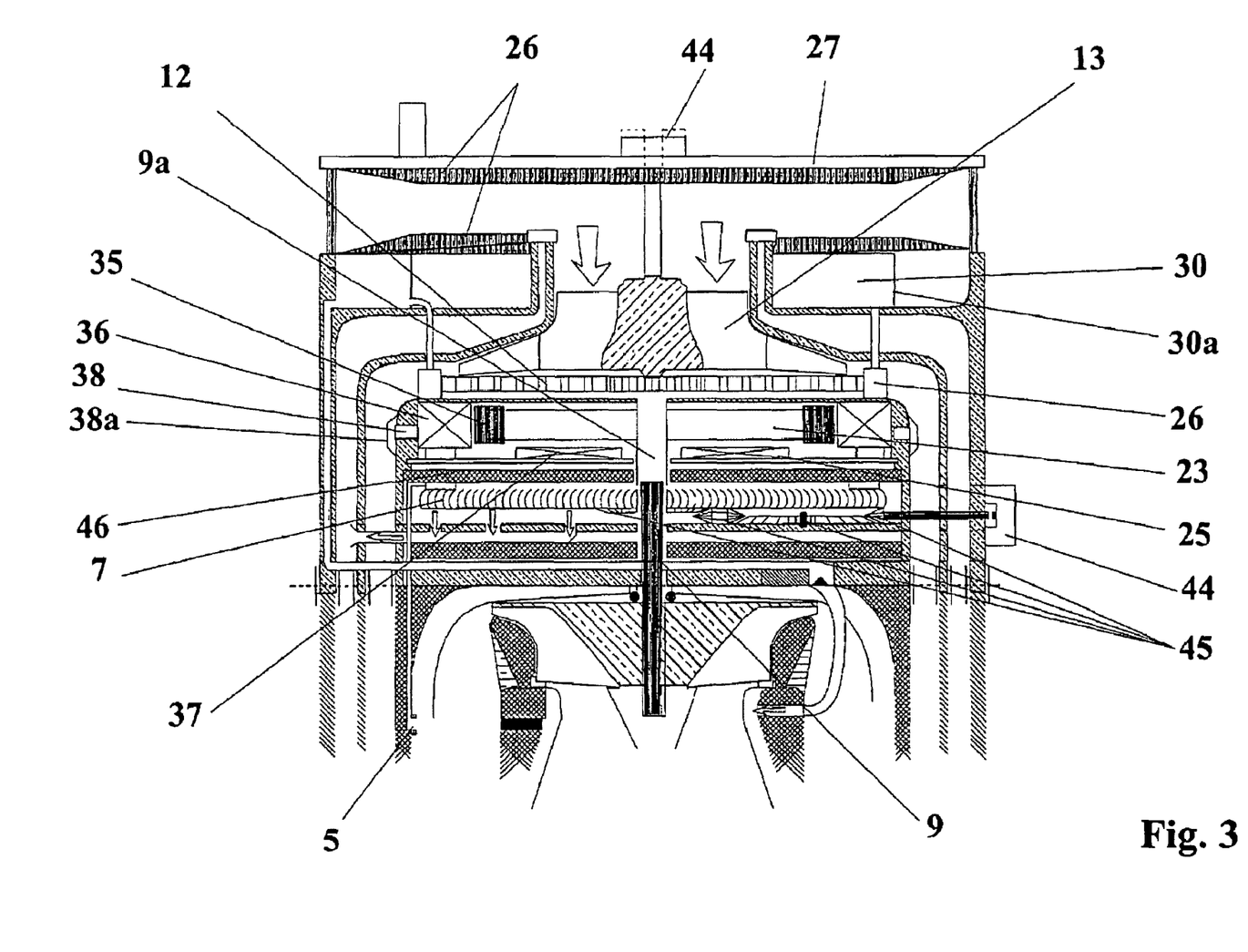
FIG. 3; Is a schematic representation of the electric alternator/starter embedded inside the SSHE rotating components, showing the position of rare earth magnets, coils, and the electronic controller.

In FIG. 3, the SSHE electric power generator or alternator and starter is shown. This electric alternator is an electronically controlled alternator-starter formed by a rotating disk 23 symmetrically containing rare earth magnets 35, magnetically coupled with symmetrical stationary coils 36. As shown in FIG. 3, representing the "head" of the SSHE, a series of multiple permanent magnets such as Ferroxdure, consisting of anisotropic sintered barium, or similar sinterized materials, are positioned on the circumference of the rotor or embedded with disk 23. Similar results can be obtained by embedding said permanent magnets 35 with the air compressor wheel 13, or vapor turbine 14, or exhaust gas turbine 15 in which case the rotor disk 23 is not necessary. The symmetric coils 36 of this alternator are embedded in the SSHE head housing or stator. These coils are connected to a bridge of high-frequency switching transistors (i.e., power MOSFET) driven by a custom made specialized computer 37 controlled by CPU system 25. The printed circuit containing all of the electronic components for the CPU system 25 (CPU card) is positioned in the vicinity of the rotor disk 23. The electric connections from the coils 36 to the power MOSFET 38 are extremely short to minimize electromagnetic noise production as a result of the fast switching. MOSFET 38 are exposed on one side to the intake air-flow through symmetrical fins 38a, thereby providing cooling. The electronic circuit utilizes electromagnetic interference suppression technologies (i.e., surface mount ferrite bead EMI) and an internal switching power supply to minimize irradiation of electromagnetic noise to the electronic systems feeding from the SSHE. The heat generated by the coils and MOSFET 38 switching is easily removed by fins 38a exposed to the high rate flowing of air 24 at the discharge of the compressor turbine 13. A thermal barrier 46 insulates the electronic equipment of the alternator assembly formed by the rotating disk 23, printed circuit 37 including CPU system 25 formed by microchips, components, sensors, etc. Thermal barrier 46 also insulates the air intake circuit to avoid unwanted heating of the air through heating of the metal rotating components such as the exhaust combustion gas turbine 15. For these reasons drive shaft 9 is formed by at least two parts or shafts coupled and concentric. Drive shaft 9 is made to withstand high temperatures, while concentric shaft 9a, essentially prolonging shaft 9, is designed to thermally de-couple the high-temperature side of the SSHE from the low temperature side.

Figure 4:
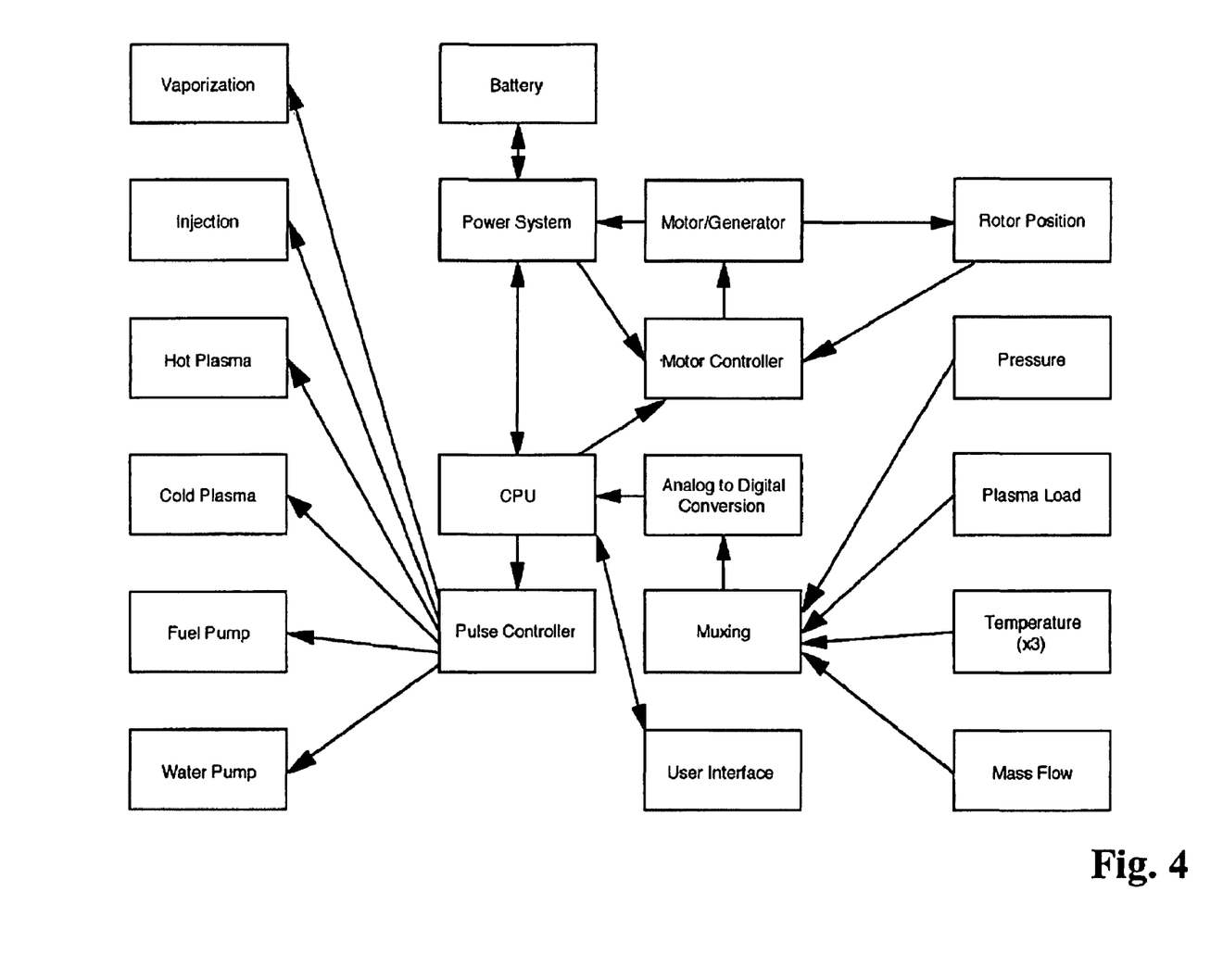
FIG. 4; Is a block diagram of the CPU control system all integrated in a printed circuit.

In FIG. 4, the electronic system diagram block is shown. The electronic control system is primarily composed of sensors and actuators designed to provide the CPU with the required information to regulate the output of the SSHE. The entire CPU structure indicated by the block diagram in FIG. 4 can be assembled with high degree of miniaturization and fit in the printed circuit board 25 located in the vicinity of the rotating alternator disk 23.

At the heart of the system, the CPU is responsible for the proper operation of the entire unit. The SSHE unit can be operated in different modes: start-up, shut-down due to submersion, shut-down due to silent mode operation, or in automatic mode which shuts-down the unit if the intake air flow sensor detects an irregular change in the air pressure. The CPU gathers the user input (startup, shutdown, silent mode, automatic mode), along with the current electrical or mechanical loading needs of the system, and adjusts the actuators to provide the desired effect. The CPU is constantly communicating with the Power System whose job is to regulate the available power based on the CPU's commands. The Power System receives power from both the battery 28 and the alternator/generator formed by the assemblies including disk 23, and will combine the two to provide the required output power. The system is designed such that only one power source (alternator/starter 23 or battery 28) is actually needed to provide the rated power, and thus, any excess power can be used to either start the SSHE burner or charge battery 28 for use in silent or automatic modes.

When the power output required by the SSHE is increased, the battery 28 (FIG. 2), the cold plasma controller 32, and hot plasma generator 33, can be assembled outside the SSHE structure into a container whose overall geometry and dimensions are the same of those of a conventional high capacity ion-lithium battery, nominally 6×4×2 inches.

Figure 5:
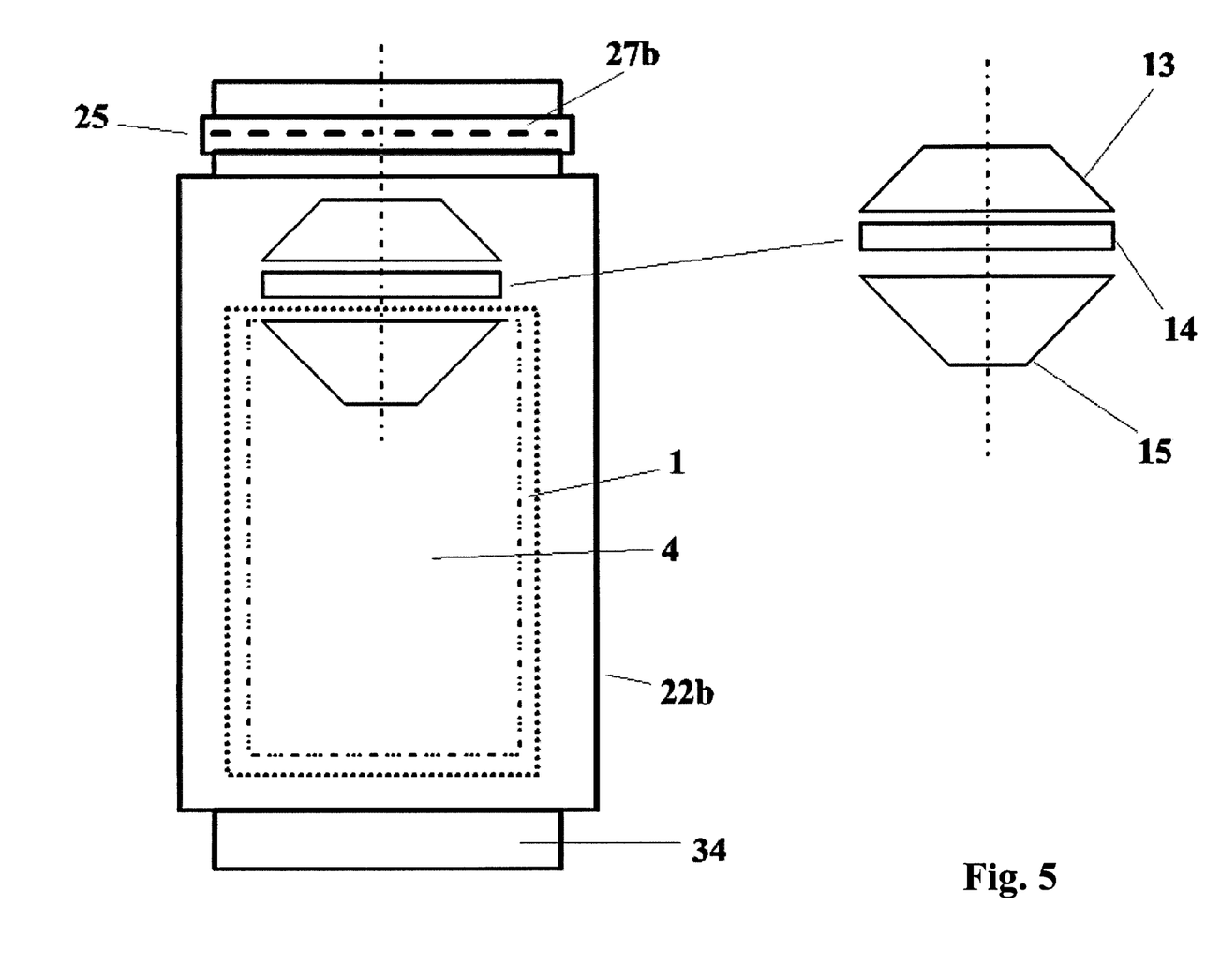
FIG. 5; Is a representation of a complete SSHE unit showing the turbine assembly and the cylindrical nature of all cavities within which the working fluid expands and condenses while the exhaust gases transfer heat inside the burner.

In FIG. 5, a preferential but not limiting SSHE configuration is shown. The dimensions of the SSHE are directly proportional to the desired power output starting from a minimum of 20 W electric with dimensions smaller than a soda-can, up to kilowatt power ranges with proportionally increased dimensions. In FIG. 5, the water sealing system is formed by a rapid spring-loaded double gate valve 27a operated by the user or automatically by the CPU structure in case of detection of water in the surrounding on the SSHE unit.

Figure 6:
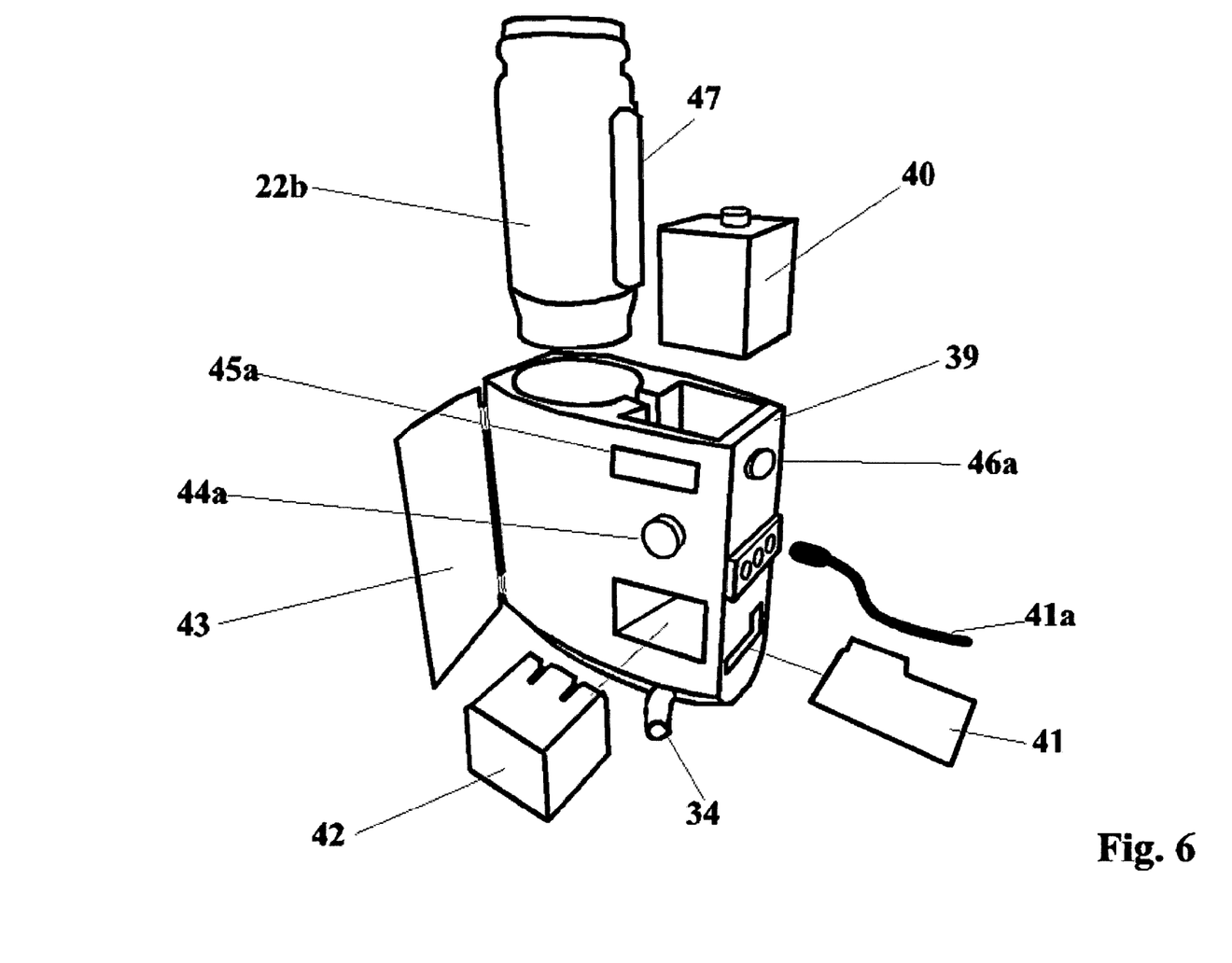
FIG. 6; Is a representation of a complete SSHE unit assembled inside a power pack having dimensions similar to those offered by a typical battery for the high density power output.
Figure 7:
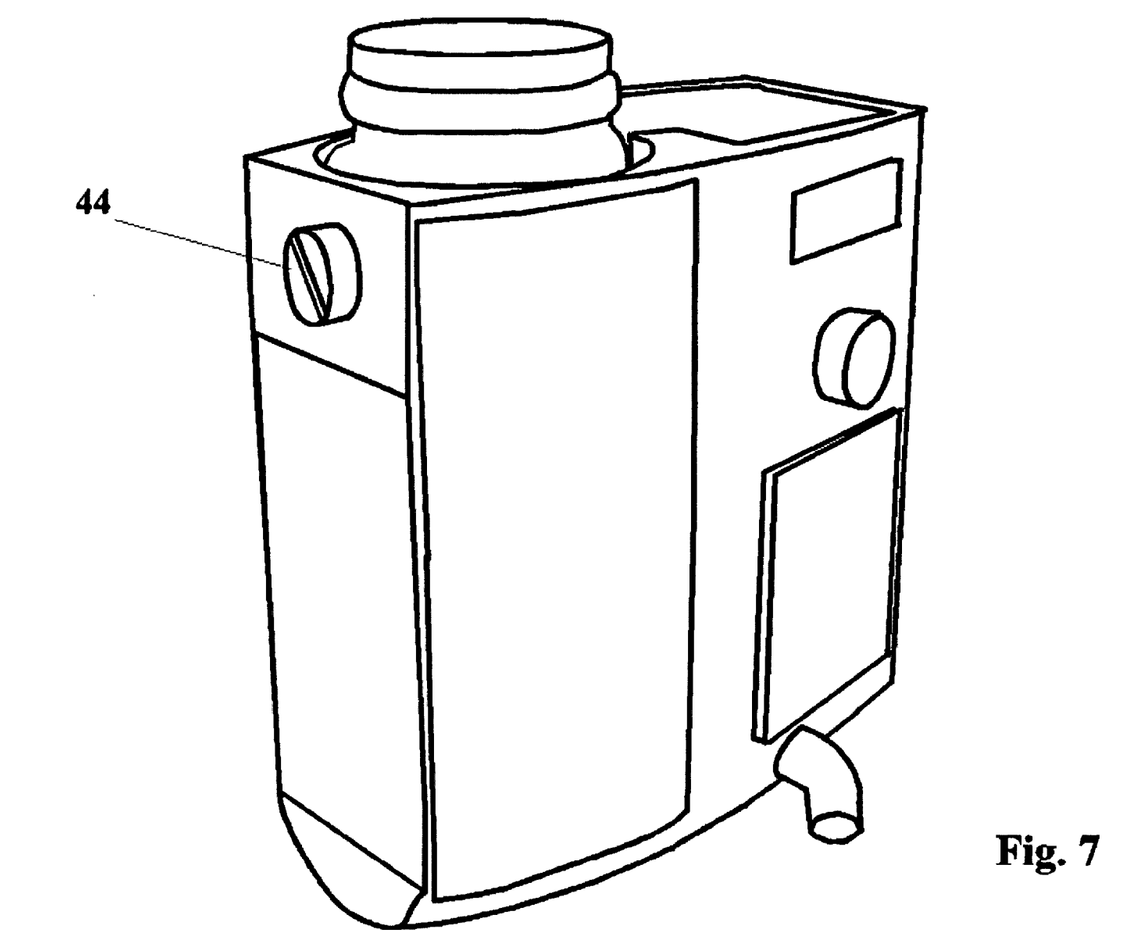
FIG. 7; Is a representation of a complete SSHE unit integrated inside a compact self sustained power pack showing a mechanical coupling able to transfer shaft power to external mechanical applications (i.e. compressors, impeller, propellers, pulleys, etc.) while still able to provide electric power at its output.

In FIG. 6, as a complete turn-key system the SSHE work unit 22b is mounted inside a container 39 supporting an external fuel tank 40, the switching power supply 41 (with internal capability for multiple voltage outputs: 12, 5, 3.3 Volts), and a rechargeable battery 42 for start-up and silent mode operations. A JP-8 fueled SSHE assembled in the configuration shown in FIG. 6 can be made with dimensions similar to those currently shown by a disposable or rechargeable battery, nominally 6×4×2 inches. The surfaces of container 39 exposed to the environment allow extensions for condensing cavities 43 to further reduce thermal signature of the unit. The supporting container 39 is equipped with strap-on connectors for easy wear-ability and integration on the user uniform/equipment. The sides of the container exposed to the environment can also provide protection from puncturing the SSHE parts since they can be made with bullet-proof materials, further reducing acoustic signature. Container 39 is also equipped with a display 45a driven by the CPU structure 25a indicating fuel consumption and availability, a start-up 46a and silent mode or shut-down button 44a, and various connectors for different voltage output 41a. In this configuration the SSHE unit is simplified by the elimination of its internal fuel tank 30a (FIG. 2), cold and hot plasma controllers 33 and 32, and start-up back-up battery 28. The CPU system integrated inside the SSHE unit is connected to the power pack 39 by means of an electrical connector 47 also equipped with hydraulic connections to receive fuel from external tank 40. In FIG. 7 the SSHE unit shows the mechanical coupler 44 available for mechanical connection to all utilities requiring mechanical shaft power rather than electric power. However, the CPU structure integrated the SSHE unit can be programmed to provide a desired torque at the mechanical coupler 44 while providing electric power at its electric output. This concludes the technical description of the Small Scale Hybrid Engine operating with fossil fuels.

What is claimed is:

1. An engine comprising:
a heat source;
a first fluid channel having a surface in thermal contact with the heat source, so that heat energy is transferred from the heat source to a first fluid flowing through the first fluid channel;
a first turbine coupled to a shaft to convert at least a portion of the heat energy transferred to the first fluid into mechanical energy;
a second fluid channel through which the first fluid flows after passing through the first turbine;
a cooling channel in thermal contact with the second fluid channel; and
a second turbine coupled to the shaft to utilize a portion of the mechanical energy to force a second fluid to flow through the cooling channel,
wherein the second fluid flowing through the cooling channel extracts heat from the first fluid flowing through the second fluid channel,
wherein the first fluid is condensable, and wherein the second fluid flowing through the cooling channel causes the first fluid flowing through the second fluid channel to condense, and
wherein the first fluid and the second fluid do not mix one another.

2. The engine of claim 1, wherein the first turbine and the second turbine are coaxially arranged about the shaft.

3. The engine of claim 1, further comprising an electric generator coupled to the first turbine to convert at least a portion of the mechanical energy into electricity.

4. The engine of claim 1, further comprising a mechanical coupler to convert the mechanical energy into a desired torque.

5. The engine of claim 1, wherein the surface of the first fluid channel is defined by a channel wall which separates the interior of the first fluid channel from the heat source.

6. The engine of claim 1, wherein the first fluid channel comprises a first section and a second section, the first section and the second section separated by a U-shaped section.

7. The engine of claim 1, wherein the second turbine is in fluid communication with an exterior of the engine and is configured to suction the second fluid from the exterior of the engine and force the second fluid into the cooling channel.

8. The engine of claim 1, wherein the second fluid channel surrounds the first fluid channel.

9. The engine of claim 1, wherein the second fluid comprises air.

10. An engine comprising:
a heat source;
a first fluid channel defined at least partially by a channel wall surrounding the heat source, the first fluid channel being separated from the heat source by the channel wall, the channel wall being configured to allow transfer of heat energy from the heat source to the first fluid flowing through the first fluid channel;
a first turbine coupled to a shaft to convert at least a portion of the heat energy transferred to the first fluid into mechanical energy;
a second fluid channel through which the first fluid flows after passing through the first turbine;
a cooling channel in thermal contact with the second fluid channel; and
a second turbine coupled to the shaft to utilize a portion of the mechanical energy to force a second fluid to flow through the cooling channel,
wherein the second fluid flowing through the cooling channel extracts heat from the first fluid flowing through the second fluid channel, and wherein the first fluid is condensable, and wherein the second fluid flowing through the cooling channel causes the first fluid flowing through the second fluid channel to condense.

11. The engine of claim 10, wherein the first turbine and the second turbine are coaxially arranged about the shaft.

12. The engine of claim 10, further comprising an electric generator coupled to the first turbine to convert at least a portion of the mechanical energy into electricity.

13. The engine of claim 10, further comprising a mechanical coupler to convert the mechanical energy into a desired torque.

14. The engine of claim 10, wherein the first fluid channel comprises a first section and a second section, the first section and the second section separated by a U-shaped section.

15. The engine of claim 10, wherein the second turbine is in fluid communication with an exterior of the engine and is configured to suction the second fluid from the exterior of the engine and force the second fluid into the cooling channel.

16. The engine of claim 10, wherein the second fluid channel surrounds the first fluid channel.

17. The engine of claim 10, wherein the second fluid comprises air.

18. An engine comprising:
a heat source;
a first fluid channel having a surface in thermal contact with the heat source, so that heat energy is transferred from the heat source to a first fluid flowing through the first fluid channel;
a first turbine coupled to a shaft to convert at least a portion of the heat energy transferred to the first fluid into mechanical energy;
a second fluid channel through which the first fluid flows after passing through the first turbine;
a cooling channel in thermal contact with the second fluid channel; and
a second turbine coupled to the shaft to utilize a portion of the mechanical energy to force a second fluid to flow through the cooling channel,
wherein the second fluid flowing through the cooling channel extracts heat from the first fluid flowing through the second fluid channel, and
wherein the first fluid is condensable, and wherein the second fluid flowing through the cooling channel causes the first fluid flowing through the second fluid channel to condense, and
wherein the engine is a mobile unit.

19. The engine of claim 18, wherein the second fluid comprises air.

20. The engine of claim 18, wherein the second turbine is in fluid communication with an exterior of the engine and is configured to suction the second fluid from the exterior of the engine and force the second fluid into the cooling channel.

* * * * *